US008207826B2

(12) United States Patent
Crooks et al.

(10) Patent No.: US 8,207,826 B2
(45) Date of Patent: Jun. 26, 2012

(54) METHODS AND APPARATUS FOR ANALYZING SIGNAL CONDITIONS AFFECTING OPERATION OF AN RFID COMMUNICATION DEVICE

(75) Inventors: John Frederick Crooks, Duluth, GA (US); Andrew Jeremy Adamec, Buford, GA (US)

(73) Assignee: NCR Corporation, Duluth, GA (US)

( * ) Notice: Subject to any disclaimer, the term of this patent is extended or adjusted under 35 U.S.C. 154(b) by 541 days.

(21) Appl. No.: 11/538,299

(22) Filed: Oct. 3, 2006

(65) Prior Publication Data

US 2008/0088416 A1     Apr. 17, 2008

(51) Int. Cl.
*H04Q 5/22* (2006.01)

(52) U.S. Cl. ............. 340/10.3; 340/13.26; 340/10.1

(58) Field of Classification Search .......... 340/10.1, 340/10.4, 10.41, 10.42, 825.71, 572.1, 517, 340/518, 540, 522, 539.31, 572.3, 572.4, 340/13.26, 10.3; 455/73

See application file for complete search history.

(56) References Cited

U.S. PATENT DOCUMENTS

| | | | | |
|---|---|---|---|---|
| 4,670,753 A * | 6/1987 | Vacanti | ............ | 342/90 |
| 4,859,991 A * | 8/1989 | Watkins et al. | ............ | 340/572.2 |
| 5,300,922 A * | 4/1994 | Stoffer | ............ | 340/572.1 |
| 5,602,531 A * | 2/1997 | Rude et al. | ............ | 340/572.4 |
| 5,942,991 A * | 8/1999 | Gaudreau et al. | ............ | 340/870.16 |
| 6,046,683 A * | 4/2000 | Pidwerbetsky et al. | ............ | 340/10.4 |
| 6,084,512 A * | 7/2000 | Elberty et al. | ............ | 340/572.1 |
| 6,150,921 A * | 11/2000 | Werb et al. | ............ | 340/10.1 |
| 6,259,991 B1 * | 7/2001 | Nysen | ............ | 701/300 |
| 6,353,406 B1 * | 3/2002 | Lanzl et al. | ............ | 342/118 |
| 6,433,671 B1 * | 8/2002 | Nysen | ............ | 340/10.41 |
| 6,483,426 B1 * | 11/2002 | Pagnol et al. | ............ | 340/10.1 |
| 6,566,997 B1 * | 5/2003 | Bradin | ............ | 340/10.2 |
| 6,639,509 B1 * | 10/2003 | Martinez | ............ | 340/10.4 |
| 6,831,562 B2 * | 12/2004 | Rodgers et al. | ............ | 340/572.4 |
| 6,894,614 B2 * | 5/2005 | Eckstein et al. | ............ | 340/572.1 |
| 6,937,674 B2 * | 8/2005 | Santhoff et al. | ............ | 375/346 |
| 6,977,504 B2 * | 12/2005 | Wright et al. | ............ | 324/326 |
| 7,065,162 B1 * | 6/2006 | Sorrells et al. | ............ | 375/343 |
| 7,312,752 B2 * | 12/2007 | Smith et al. | ............ | 342/464 |
| 7,372,364 B2 * | 5/2008 | Mercer et al. | ............ | 340/572.1 |
| 7,421,249 B2 * | 9/2008 | Ariyoshi et al. | ............ | 455/67.13 |
| 7,448,547 B2 * | 11/2008 | Esterberg | ............ | 235/435 |
| 7,479,883 B2 * | 1/2009 | Chiu | ............ | 340/572.4 |
| 7,510,117 B2 * | 3/2009 | Esterberg | ............ | 235/435 |
| 7,512,378 B2 * | 3/2009 | Rofougaran et al. | ............ | 455/20 |
| 7,543,742 B2 * | 6/2009 | Takeuchi | ............ | 235/380 |
| 2004/0239504 A1 * | 12/2004 | Kalinin et al. | ............ | 340/572.5 |
| 2005/0052282 A1 * | 3/2005 | Rodgers et al. | ............ | 340/572.1 |
| 2005/0099302 A1 * | 5/2005 | Lieffort et al. | ............ | 340/572.7 |
| 2005/0151650 A1 * | 7/2005 | Wright et al. | ............ | 340/572.4 |
| 2005/0170784 A1 * | 8/2005 | Ariyoshi et al. | ............ | 455/67.13 |
| 2005/0201450 A1 * | 9/2005 | Volpi et al. | ............ | 375/150 |
| 2005/0231367 A1 * | 10/2005 | Bellantoni | ............ | 340/572.1 |
| 2006/0068711 A1 * | 3/2006 | Chiu et al. | ............ | 455/67.7 |
| 2006/0261952 A1 * | 11/2006 | Kavounas et al. | ............ | 340/572.2 |
| 2006/0261953 A1 * | 11/2006 | Diorio et al. | ............ | 340/572.2 |
| 2007/0063818 A1 * | 3/2007 | Witherspoon et al. | ............ | 340/10.1 |
| 2007/0222608 A1 * | 9/2007 | Maniwa | ............ | 340/572.7 |

* cited by examiner

*Primary Examiner* — Daniel Wu
*Assistant Examiner* — Rufus Point
(74) *Attorney, Agent, or Firm* — Peter Priest (57) ABSTRACT

Systems and techniques for generating data showing a signal environment experienced by a radio frequency identification (RFID) communication device. A transceiver within the communication device sweeps through a frequency range of interest in order to receive signals within the frequency range. Depending on the nature of the signals of interest, the signals detected may be reflected signals generated in response to a carrier signal produced by the communication device, or active signals produced by active sources. Baseband analysis is performed in order to detect and identify reflective signals, and spectrum analysis is performed in order to detect and identify active signal sources.

22 Claims, 5 Drawing Sheets

METHODS AND APPARATUS FOR ANALYZING SIGNAL CONDITIONS AFFECTING OPERATION OF AN RFID COMMUNICATION DEVICE

FIELD OF THE INVENTION

The present invention relates generally to improvements related to the use of electronic shelf labels (ESLs), radio frequency identification (RFID) tags, and other radiofrequency (RF) devices which are utilized, for example, to provide convenient access to pricing and other desired information for goods. More particularly, the invention relates to improved systems and techniques for analyzing signals affecting the operation of RFID communication devices in a facility.

BACKGROUND OF THE INVENTION

The use of radiofrequency identification (RFID) devices such as RFID tags, electronic shelf labels (ESLs) and other RFID devices that provide information and receive information and commands wirelessly through means such as reflective backscatter is becoming more and more common. Such devices are deployed in many different facilities, with each facility having its own individual characteristics affecting the signals that are transmitted to and returned from the devices.

Many facilities using RFID devices employ large numbers of RFID devices with multiple RFID communication and control devices, such as communication base stations and RFID readers. Such RFID communication and control devices will be referred to here generally as "RFID communication devices," or simply "communication devices," for convenience, but it will be recognized that communication devices referred to here may, depending on the design and use of the specific device, simply read information from an RFID device or may send information and commands to and receive information from a device. RFID communication devices may be deployed in numerous different locations in a facility, and one or more communication devices may be portable communication devices that are moved about a facility. The effectiveness with which a communication device performs communication depends in significant part on the conditions prevailing at the specific location in which the particular communication device is placed. Such conditions include the presence, absence, type, and degree of electromagnetic interference and noise, as well as the presence and nature of obstructions that may shield a communication device from signals intended to be used for communication. Noise or interference affecting a communication device may include passive noise or passive interference, such as reflections or returns of signals emitted by the communication device. A communication device may also be affected by active noise or interference, which includes signals emitted by active sources operating independently of any signals emitted by the communication device. Each location in a facility at which a fixed communication device is placed can be expected to be subject to a set of conditions that may be unique in combination. In addition, portable or mobile communication devices may pass through numerous locations having differing characteristics.

It is difficult to understand and correct or compensate for the conditions affecting a particular communication device without an understanding of the specific conditions affecting that communication device. Surveying the general environment is frequently costly and time consuming, and typically does not accurately show the specific conditions at each communication device.

It is possible to take steps to reduce interference and signal blockage, or to mitigate their effects, but it is difficult to do so when the environments in which such devices are used may change rapidly. For example, in grocery stores or warehouses, products are constantly being moved, and at different times, particular shelves may be full, partially full, or empty of products, or may have changing mixes of products stocked thereon. Differing contents of shelves may have significantly differing effects on communication.

SUMMARY OF THE INVENTION

Among its several aspects, the invention addresses such difficulties by providing for signal analysis capability for one or more communication devices to be placed in a facility. The analysis capability suitably includes the ability to analyze active sources of interference, passive sources, or both. Analysis may include baseband analysis, in which a signal is downconverted to remove higher frequency components of a carrier wave, leaving signal components representing an original signal used to modulate the carrier wave for transmission. Baseband analysis can allow for the detection of passive signals and interference, resulting from the reflection of a carrier wave emitted by the communication device, as well as some forms of active signals and interference. For example, baseband analysis can detect interfering signals resulting from reflection of carrier waves emitted by other communication devices at frequencies near those used by the communication device for which analysis is being conducted.

The invention also provides the capability of spectrum analysis, that is, of analysis of the frequency components of a received carrier wave, typically transmitted by an active source. Spectrum analysis is performed by sweeping through a specified frequency range and successively detecting signal power at each of a plurality of relatively narrow frequency bands within the frequency range. Spectrum analysis can be used to create a profile of an active signal source that can be analyzed to identify the type of source producing the signal.

Depending on the processing capability desired for the communication device, a communication device may pass raw signal data to a server for processing, display, and analysis, or the communication device may process the signal data and display the data directly or pass display information to a central server, for example, through a network connection. Display may include graphic or numerical display, or both, and analysis may include manual analysis of results, and may also include automatic analysis, such as comparing signal data against predefined or computed criteria.

A more complete understanding of the present invention, as well as further features and advantages of the invention, will be apparent from the following Detailed Description and the accompanying drawings.

DETAILED DESCRIPTION

Figure 1:
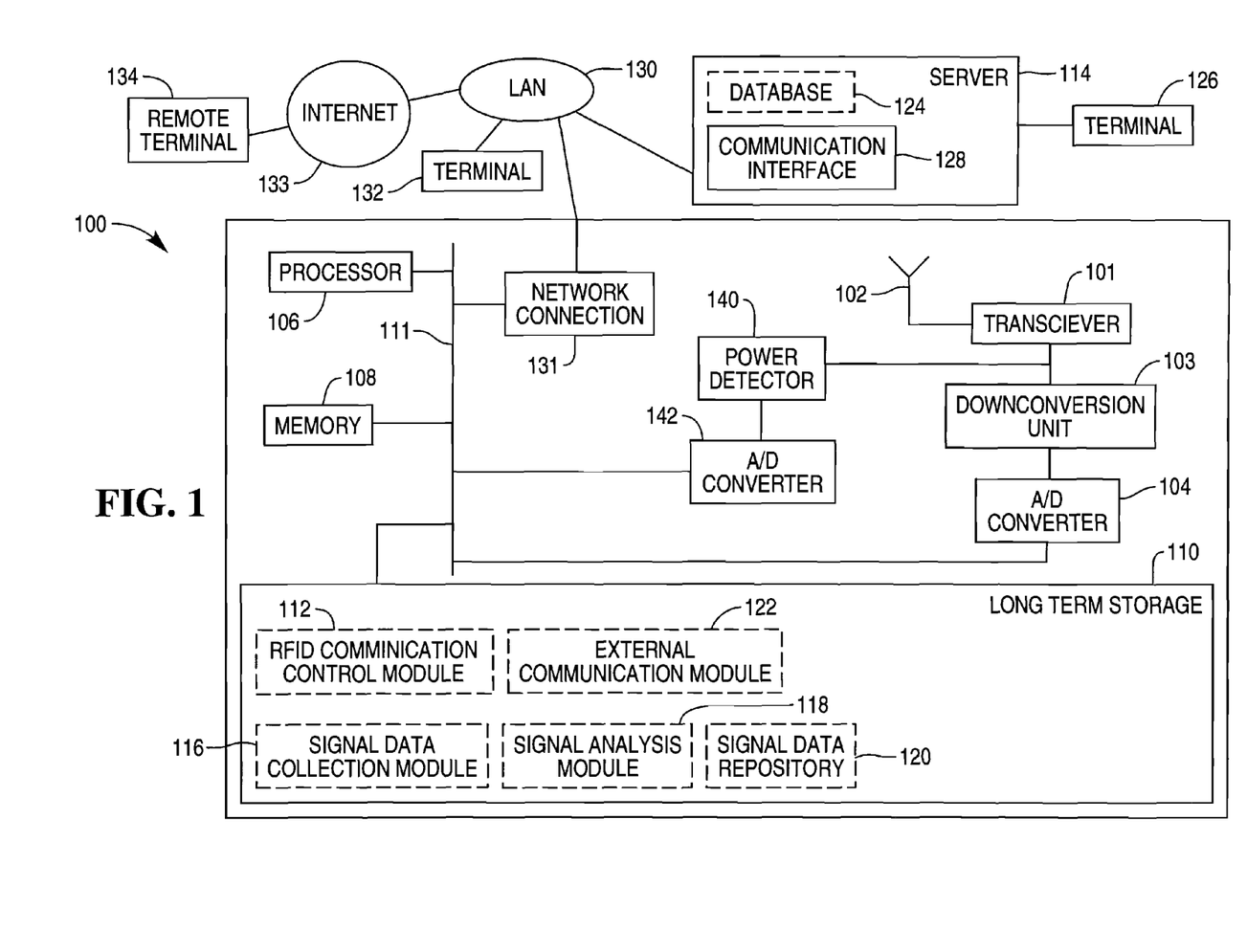
FIG. 1 illustrates an RFID communication device according to an aspect of the present invention.

FIG. 1 illustrates an RFID communication device 100 according to an aspect of the present invention. The communication device 100 is capable of communicating with devices employing reflective backscatter to communicate information to the communication device. Such devices include RFID tags and electronic shelf labels, for example. The communication device 100 suitably includes a transmitter and a receiver, suitably implemented as a transceiver 101. The communication device 100 also includes an antenna 102, a downconversion unit 103, an analog to digital converter 104, a processor 106, high speed memory 108 and long term memory 110. The long term memory 110 may suitably be a hard disk, semi-permanent memory such as flash memory, or other preferably nonvolatile memory, as desired. The processor 106 may suitably be a general purpose processor or alternatively may be a specialized processor, such as a digital signal processor, dedicated to the operations of the communication device 100. The transceiver 101, analog to digital converter 104, processor 106, high speed memory 108, and long term memory 110, are suitably connected to a bus 111 allowing communication between various components. In particular, the processor 106 is able to control the operation of the transceiver 101, for example, directing transmission of a carrier signal by the transceiver 101 and selecting frequencies at which the carrier signal is to be transmitted. The operation of the processor 106 suitably occurs under the control of various software modules suitably hosted in long term memory 110 and transferred to high speed memory as needed for execution by the processor 106.

The transceiver 101 is typically capable of receiving signals in a relatively high carrier frequency range, for example, 900 megahertz (MHz) or 2.4 gigahertz (GHz). The specific carrier frequency range will typically depend on the specific design of the communication device 100. For example, if the communication device 100 is used as a communication base station for communication with electronic shelf labels, the transceiver will typically operate in the 2.4 GHz range. If the communication device 100 is used as a reader to interrogate and receive information from RFID tags, the transceiver 101 may operate in a frequency range of 900 MHz.

Signals received by the transceiver 101 are passed to the downconversion unit 103 and downconverted or demodulated so as to remove the higher frequency components of the carrier signal used for transmission of the signals received by the transceiver 101. The downconversion results in a downconverted signal at a lower frequency and encompassing a narrower bandwidth, characteristic of the original signal modulated onto the carrier signal. The downconverted signal is suitably within a baseband frequency range, for example, a frequency range around 64 kilohertz (kHz). Such downconversion allows conversion of the signals to digital form and processing of the signals once they have been converted to digital form.

The output of the downconversion unit 103 is passed to the analog to digital (A/D) converter 104, which converts the signals to digital form and makes them available for processing, suitably by placing its output on a bus 111 accessible to the processor 106, memory 108 and long term memory 110. In order to receive data from devices such as RFID tags and electronic shelf labels, the communication device 100 processes the digital data generated by the A/D converter 104 using known means, suitably under the control of an RFID communication control module 112. The RFID communication control module 112 and other modules controlling the operation of the communication device 100 are suitably implemented as software hosted on the long term storage 110.

In order to allow for an understanding of signals that may affect communication, the communication device 100 is able to perform one or both of baseband and spectrum analysis on signals present in the environment as those signals are experienced by the communication device 100. Baseband analysis is performed on a downconverted signal, and is particularly useful for detection of passive sources of interference, that is, signals representing the modulated backscatter reflection of carrier signals emitted by the communication device 100 or by other RFID communication devices operating in the environment. Baseband analysis can typically be performed using hardware components used in normal operation of a reader, without a need for any additional hardware dedicated to performing the analysis.

Spectrum analysis is performed on the higher frequency carrier signal, and is useful for identifying active signal sources, such as active RF transmitters used in communication or presenting interference, and can be used to identify a signal source as belonging to a particular type.

In performing signal analysis, the communication device 100 suitably operates under the control of a signal data collection module 116 and a signal analysis module 118, for collecting and processing signal data. The signal data collection module 116 stores the data for later analysis, suitably in a signal data repository 120, or alternatively passes the data to the signal analysis module 118 for immediate analysis. The signal data collection module 116 may suitably be capable of directing the collection of baseband signal data, high frequency signal data, or both. As noted above, the gathering and analyzing of baseband signal data may suitably be performed using the hardware components used for normal operation of an RFID communication device, so the gathering and analyzing of baseband signal data will be discussed first.

Baseband signal data is frequently generated as a result of reception and downconversion of passive signals received at the communication device 100 in response to the transmission of a carrier signal by the communication device 100. When the communication device 100 transmits a communication signal comprising a carrier signal, RFID devices within range of the communication device 100 modulate the carrier signal and return the carrier signal to the communication device 100 as a reflected carrier signal.

Additional signals representing reflections of the transmitted carrier signal may also be received at the communication device, and such signals may suitably be referred to as passive interference. Passive interference may be mistakenly interpreted as genuine responses from a device, or may interfere with genuine responses so as to render them unreadable. Numerous sources of passive interference exist. Such sources include fluorescent lighting with magnetic or electronic ballasts, moving fan blades, neon signs, and other RFID communication devices positioned too close to the communication device 100. These sources of interference may cause reflections of carrier waves emitted by the communication device 100 at various frequencies, and in order to analyze interference from such sources, the communication device 100 transmits a carrier wave and simultaneously receives any reflections of the wave. The received reflections are made available for processing and analysis. In addition, baseband analysis may also be useful to identify the presence of interference that does not result from a reflection of the carrier signal emitted by the communication device 100. Such interference may arise from other communication devices similar to the communication device 100 and operating in the same location. Conflicts between communication devices operating in the same location may be avoided by configuring the communication devices to perform frequency hopping in such a way that they do not operate on the same frequency at the same time. If two or more communication devices are operating in such a way that they are using nearby frequency ranges at the same time, one or both may present interference with the other. In addition, a communication device may experience interference produced by reflections or direct modulation of signals produced by another communication device, if the communication devices are using too closely adjacent frequencies. Baseband analysis may be used to detect the presence of such interference.

In order to perform analysis of passive interfering signals, the signal data collection module 116 directs the transceiver 101 to transmit a carrier signal sweeping through a predetermined range of frequencies. The range of frequencies is calculated to yield useful information relating to sources of passive interference that will affect the communication device 100 during normal operation. The transceiver 101 is suitably capable of transmitting and receiving at the same time. Such a capability is useful to the RFID communication device 100 in normal operation, allowing the communication device to transmit carrier signals to RFID devices and receive modulated reflections of the carrier signals in response.

When reflected signals are received at the communication device 100, they are downconverted by the downconversion unit 103. The downconversion unit 103 reduces the received signals to a baseband frequency range commonly used by the communication device 100 for processing signals received in normal operation. An example of a baseband frequency range that may be used is a range on order of around 64 KHz.

The ADC 104 samples the downconverted signal data generated by the downconversion unit 103 to convert the signal data to digital format. The digital signal data output by the ADC converter 104 is made available for processing and analysis.

Reflected noise produced by a reflection of a carrier wave signal generated by the transceiver 101 can be expected to have frequencies in a bandwidth centered around the frequency of the carrier wave signal. The transceiver 101 therefore has a receiving bandwidth wide enough to allow determination of the bandwidth of noise reflected as a result of each transmission of a carrier signal. In performing analysis of passive interference, the speed at which the transceiver 101 sweeps across frequencies is not critical, because a passive interference source produces interference in response to a carrier wave transmitted by the transceiver 101, and if a source produces passive interference in response to a particular carrier frequency, it will typically produce this interference so long as a carrier wave is being transmitted at that frequency.

As noted above, the transceiver 101 is able to transmit a carrier signal and receive reflected carrier signals at the same time. The transceiver 101 is also able to receive the reflected carrier signals at a sufficient bandwidth to encompass the entire frequency range of reflected carrier signals produced in response to a carrier signal having a particular frequency. Once the reflected carrier signal has been downconverted and converted to digital form, it is analyzed, for example, by performing a fast Fourier transform (FFT) on the signal data. After the analysis, the signal power at each frequency within the frequency range under analysis is recorded. In one exemplary embodiment of the invention, data generated by the ADC 104 is stored, and analysis on the data performed, on board the communication device 100, but as is discussed in greater detail below, the output of the ADC 104 may be stored for analysis elsewhere.

Analysis of reflected baseband signals yields information indicating the carrier signal frequencies that are susceptible to reflective interference, as well as the bandwidth and amplitude of such interference. This information provides insight into the nature of the reflective interference and guides understanding into what actions can be taken to avoid the interference and improve performance.

In addition to performing baseband analysis of passive signals by sweeping through a range of transmission frequencies and monitoring returned signals, the communication device 100 may also collect baseband signal data for signals that do not represent reflection of the carrier signal transmitted by the device 100. Such signals might include reflected signals representing reflections or direct modulation of signals transmitted by other communication devices. To obtain information for signals independent of transmissions by the device 100, the signal data collection module 116 may suitably direct the transceiver 101 to monitor signals across a frequency range without a simultaneous carrier transmission. The signals received by the transceiver 101 would be downconverted by the downconversion unit 103 and passed to the ADC 104, and the signal information thus collected could then be processed in ways similar to the processing performed for passive baseband signal information.

As digitized signal data is output by the ADC 104, it is directed to an appropriate destination by the signal data collection module 116. To take one example, a destination might include the repository 120. As data is produced by the ADC 104 and stored in the repository 120, it is processed under the control of the signal analysis module 118. Processing may suitably include performing a fast Fourier transform operation on the data. Once the data has been processed, power level data indicating the signal power at each frequency is stored, again, suitably in the repository 120. The processed signal data may then be transmitted to an external destination, such as the server 114. This transmission may suitably be conducted under the control of the external communication module 122. The server 114 may store the processed signal data in a database 124 for later use and analysis. Such use and analysis may include display of results in numerical or graphical format, for example, using a terminal 126. Communication between the communication device 100 and the server 114 may be conducted using a communication interface 128 built into the server 114. The communication interface 128 suitably allows access to a local area network 130, which may provide support for wired or wireless communication between different devices. For example, depending on the nature of the communication device 100, the communication device may communicate through a wired or wireless network connection 131. In addition, the local area network 130 may provide a connection to network terminals such as the terminal 132, or may provide a further connection to the public Internet 133, through which remote terminals such as the terminal 134 may communicate with the server 114 and through the server with the communication device 100.

As an alternative to processing the data output by the ADC 104 on board the communication device 100, the signal data collection module 116 may simply direct that the data be transmitted to an external destination, such as the server 114, for processing. This may be done with or without the intermediate step of storing the collected data in the repository 120. The server 114 would then perform processing similar to that performed by the signal analysis module as discussed above, and would then store the results of the processing for later use and further analysis.

Analysis of passive interference, as noted above, provides information identifying the bandwidth of frequencies at which interference occurs about each carrier signal frequency. In addition, information identifying the signal power of interference at each frequency is provided. Analysis of this information helps provide understanding of what actions should be taken to avoid or prevent interference and to improve performance.

A communication device such as the communication device 100 is typically capable of performing baseband analysis such as that described above without the use of any additional hardware beyond that needed for normal operation. A typical RFID communication device can be given the capability to perform baseband analysis without additional hardware cost, by adding software performing functions similar to those performed by the modules 116, 118, and 122 described above.

Baseband analysis as described above typically provides information relating to the presence and strength of interference at particular frequencies, but may not detect active sources of interference. Active sources frequently operate in bursts, and if an active source only operates for short intervals, the source may not be active at an instant in which the transceiver 101 is monitoring the environment for the frequency at which the source operates.

In addition, baseband analysis may be unable to identify an active signal source as belonging to a particular type. An active signal source is a source that transmits its own signals that are not dependent on the presence or reflection of a carrier wave transmitted by the communication device 100. Information relating to such sources may be advantageously obtained through spectrum analysis, which is an analysis of signal power over a range of signal frequencies emitted by the sources.

In order to provide the communication device 100 with a spectrum analysis capability, the communication device 100 may include additional hardware to allow for such analysis. Such hardware suitably includes a power detector 140, connected to the transceiver 101 in order to receive signal information from the transceiver 101 before the signal information is downconverted. In addition, the communication device 100 suitably includes a second analog to digital converter 142, in order to sample the signal data produced by the power detector 140 and convert the signal data to digital format. The output of the ADC 142 is placed on the bus 111 and made available to the memory 108 and for processing by the processor 106.

In order to perform spectrum analysis, the signal data collection module 116 directs the transceiver 101 to do a relatively rapid sweep across a frequency range of interest, in which the transceiver 101 monitors signals at each frequency of interest. The sweep may be performed repeatedly. Many sources of active interference operate in bursts, and the transceiver 101 makes a rapid sweep across frequencies in order to detect sources that may operate unpredictably and for short times, and in any case operate independently of the communication device 100. The transceiver 101 is able to monitor frequencies over a narrow bandwidth in order to distinguish between different sources operating at different frequencies, with both frequencies falling within the overall range under examination. That is, the transceiver 101 is able to successively examine each of a number of adjacent narrow frequency ranges within an overall frequency range of interest.

Once the ADC 142 has placed the signal power information on the bus 111, the information may suitably be directed to various destinations in ways similar to those described above with respect to the output of the ADC 104, used to analyze passive signal data. For example, the signal data collection module 116 may pass the data to the signal analysis module 118, with or without an intermediate step of storing the data in the repository 120. The signal analysis module 118 may perform appropriate analysis, such as a fast Fourier transform on the data, and may store the processed data in the repository 120, where it may be passed on for further analysis and use. Alternatively, to save processing resources for the communication device 100, the data produced by the ADC 106 may be passed to the server 114 for processing.

Spectrum analysis of an active interfering signal received at the communication device 100 can provide an instantaneous profile of the active source providing the signal. This profile can be analyzed in order to gain insight into the type of source providing the signal, and this insight can be used to identify ways to reduce or eliminate the interference. In addition, desired signals may be received from active signal sources. One possible source of such signals would be an RFID label that actively transmitted information. An RFID communication device receiving a signal from such an active electronic shelf label could perform spectrum analysis on the received signal and examine the signal profile produced by the analysis to determine if the signal met the expected characteristics for an RFID label.

Both baseband and spectrum analysis may be performed at a wide variety of desired times and conditions. For example, either or both of baseband and spectrum analysis may be performed at the time communication devices are installed in a facility. Alternatively, analysis may be conducted to detect interference whenever performance is deemed to be unsatisfactory, or may be conducted at regular intervals so as to detect and remove any sources of interference that may be present. Such analysis may be performed, for example, under the direct control of a user, with the user being able to select a communication device for which analysis is to be performed and to select the type of analysis, as well as parameters affecting the analysis, such as the range of frequencies that are to be examined. A user not does require direct access to a communication device, but may instead issue commands through the terminal 126, the network terminal 132, or the remote terminal 134, in order to direct the server 114 to control the gathering of information by the communication device 100 and to direct processing and presentation of information by the communication device 100 or the server 114. Such a capability is particularly useful because it may be desired in some installations to place communication devices such as the communication device 100 in inaccessible locations. In such cases, the ability to remotely provide commands to, and receive information from, the communication devices is highly advantageous. In addition, the ability to carry on communications with communication devices such as the communication device 100 through the public Internet 134 allows for a service provider, such as a vendor, to gain information needed to solve problems without needing to visit a site in which communication devices may be deployed.

In the case of both passive and active interference analysis, analysis may be performed and results formatted to show signal behavior over the time domain, the frequency domain, or both. Suitably, a presentation of a set of results is formatted to show behavior under the time domain or the frequency domain, but multiple presentations of results may be performed in order to show the different sets of information that may be desired.

Results over the time domain are useful to show times at which interfering signals arise or at which the behavior of a transmitted or received signal changes in such a way as to indicate the presence of interference. Such information may be particularly useful in detecting sources of impulsive interference. Such interference frequently results from the activity of active interference sources, and helps to identify such sources by identifying differences occurring in signals received at the same frequency but at different times. Results over the frequency domain are useful to show signal strengths and behavior at particular frequencies, and are useful in determining the identity of particular signal sources by identifying the frequencies at which signals are strongest, or at which desired signals are most strongly affected.

Figure 2:
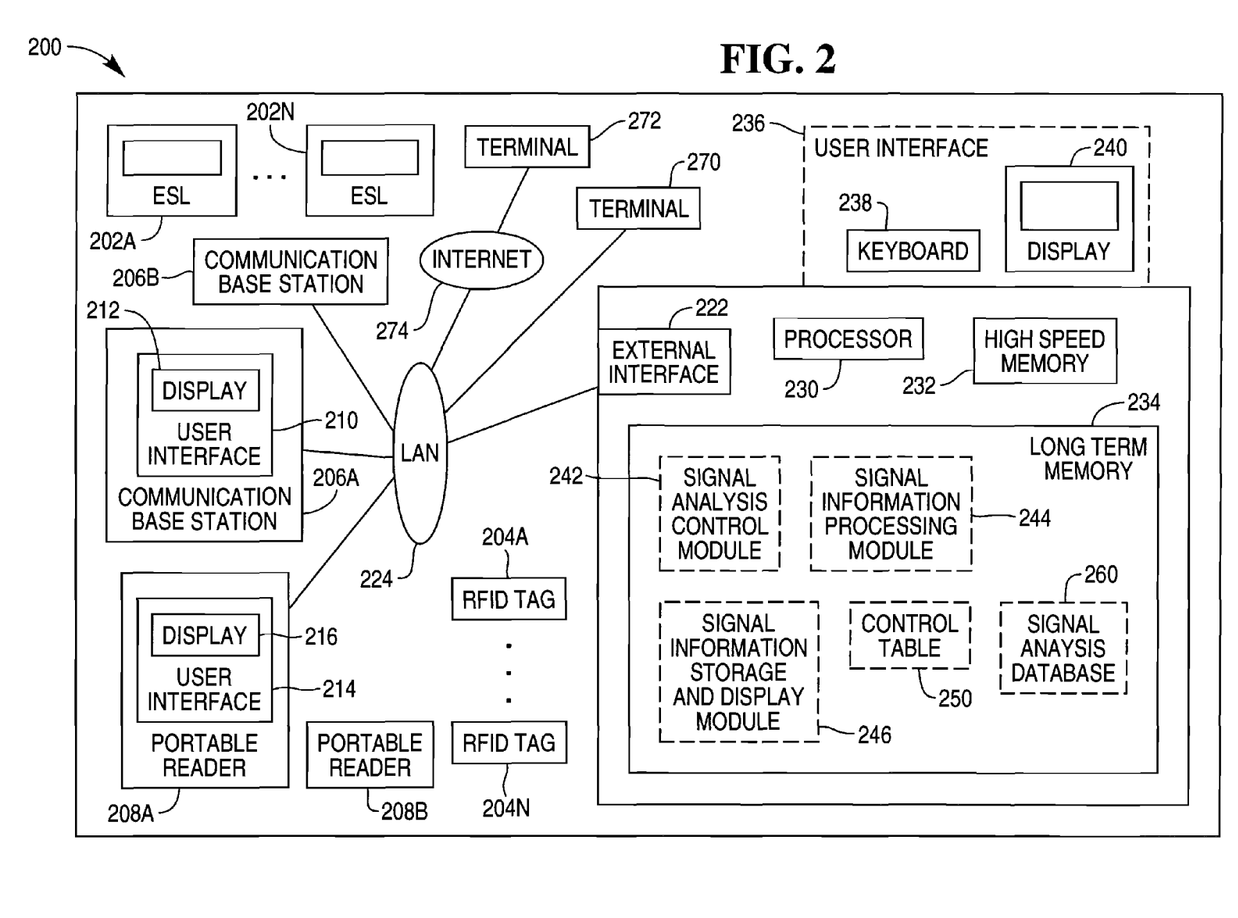
FIG. 2 illustrates a system of RFID communication devices, and devices such as ESLs and RFID tags with which communication is carried out, according to an aspect of the present invention.

FIG. 2 illustrates a system 200 using a plurality of devices employing wireless communication using techniques such as reflective backscatter to provide and receive information. The devices include a plurality of electronic shelf labels (ESLs) 202A . . . 202N and a plurality of RFID tags 204A . . . 204N. Communication with the ESLs is accomplished using communication base stations 206A and 206B and reading of the RFID tags is accomplished using portable RFID readers 208A and 208B. Only two communication base station 206A and 206B and two RFID readers 208A and 208B are shown here in detail for simplicity of illustration, but it will be recognized that numerous units similar to those represented here are typically employed and that systems similar to the system 200 illustrated here may employ as many communication base stations and RFID readers as desired, and that these base stations and readers may be deployed in any desired configuration.

Numerous different sources of interference may be present in a facility in which the system 200 is used. In order to provide for detection and evaluation of interference, the system 200 includes facilities for analyzing signal data relating to signals affecting each of the communication base stations 206A and 206B and the RFID readers 208A and 208B. Such signals may include the communication signals emitted and received by each of the readers, as well as active and reflective sources of interference. Numerous other conditions may appear, and their effects as experienced by the base stations 206A and 206B and the readers 208 and 208B can be detected and analyzed.

Each of the base stations 206A and 206B and the readers 208A and 208B may suitably include signal analysis components similar to those of the reader 100 of FIG. 1, allowing gathering of signal data relating to active and passive sources of interference. Depending on the specific configuration and capabilities desired for each of the base stations and readers, one or more of the base stations and readers may implement only the capability to provide for analysis of passive sources of interference, because such capability can be implemented without the addition of hardware components beyond those used for normal reading of and communication with RFID devices.

In addition, each of the communication base stations and readers includes facilities allowing receiving of commands relating to gathering of signal information and transmission or presentation of signal information, as well as optional processing of the signal information.

For example, the base station 206A suitably includes a user interface 210 including a display screen 212, and the reader 208A suitably includes a user interface 214 including a display screen 216. The base station 206B and the reader 208B suitably include similar components. These components are preferably designed to allow a user evaluating the conditions experienced by a station to directly enter commands for the station and immediately observe results. For example, the display screens 212 and 216 may suitably provide touchscreen capabilities, allowing a user to enter data and commands through a suitable interface displayed on the screens 212 and 216, respectively. Examples of commands that may be entered are commands initiating an analysis, directing whether analysis is to be performed for active or passive signals, or specifying the frequency range over which analysis is to be conducted and the rate at which the base station or reader is to sweep through frequencies. Additional commands may include commands for formatting and presentation of information generated as a result of the analysis.

Alternatively, any or all of the base stations 206A and 206B and the readers 208A and 208B may also be implemented without a user interface or a display screen. In such a case, commands are provided externally and data is relayed to an external destination, such as a server 220.

The server 220 communicates with the communication base station 206 and the reader 208 using an external interface 222, providing a connection to a local area network 224. The local area network 224 suitably provides wired or wireless connections to the communication base stations 206A and 206B and the RFID reader 208A and a wireless connection to the RFID reader 208B. The server 220 includes a processor 230, high speed memory 232, long term memory 234 such as a hard disk, and user interface 236, including a keyboard 238 and display 240. The server 220 suitably uses a plurality of modules to transmit commands and information to and receive and process information from the communication base stations 206A and 206B and the RFID readers 208A and 208B. In addition to standard modules controlling the normal operation of the base stations 206A and 206B and the RFID readers 208A and 208B, which are not shown here in order to avoid unnecessary complexity, the server 220 also uses a signal analysis control module 242, a signal information processing module 244, and a signal information storage and display module 246. The modules 242-246 may suitably be implemented as software hosted in the long term memory 234 and transferred to high speed memory 232 as necessary for execution by the processor 230.

The signal analysis control module 242 suitably controls the signal analysis to be performed by each of the base stations 206A-206C and the readers 208A and 208B, and the processing, storage, and analysis performed by the server 220. The signal analysis control module 242 may adapt the operation of the server 220 to any number of possible procedures. For example, a specific base station or reader may be directed to perform an analysis at particular time or over a particular interval based on a specific command entered via the keyboard 238 and directed to the base station or reader. Alternatively, analysis may be performed according to a schedule, for example, a schedule stored in a control table 250. As a further alternative, signal information may be received from base stations or the reader without a command from the server 220, with the analysis control module 242 controlling the operation of the server 220 as needed to detect the incoming signal information and perform any needed analysis and storage.

When the analysis control module 242 directs analysis by the base stations and the reader, it suitably sends commands specifying the analysis to be performed. For example, the analysis control module 242 may direct that a base station or reader perform baseband analysis, spectrum analysis, or both. For each type of analysis, the frequency range to be evaluated may be specified, as well as the rate at which the base station or reader is to sweep through frequencies.

The analysis control module 242 also directs the processing to be performed by the server 220. For example, as noted above with respect to FIG. 1, a communication base station or reader may be designed so as to perform signal processing on-board, or alternatively to transmit raw information to a central unit such as the server 220. If a base station or reader performs processing, such as fast Fourier transform processing, onboard, the signal information may be routed by the analysis control module 242 to the signal information and processing module 246. If a base station or reader simply sends raw information to the server 220, the signal information will be routed by the analysis control module 242 to the signal information storage and display module 246.

Once information has been processed and routed to the signal information storage and display module 246, the information is displayed, stored, or both, depending on selections occurring under the control of the analysis control module 242. These selections suitably depend on predetermined choices or by immediate selections entered using the keyboard 238. For example, it may be desired to compile statistical information for one base station or a plurality of base stations and readers and examine this information at a later time. In such a case, the information is stored in a signal analysis database 260, and may or may not be displayed as it is processed. On the other hand, it may be desired simply to allow a user to observe real time information collected by one of the base stations or readers. In such a case, the information will be displayed and may or may not be stored in the database 260. In still another case, it may be desired to examine information that has previously been stored in the database 260. In such a case, the signal analysis control module 242 will simply direct retrieval, formatting and display of appropriate information, either automatically or in response to preprogrammed instructions.

In addition to providing a user interface to the server 220, and therefore allowing user instructions to the communication base stations 206A and 206B and the readers 208A and 208B, through the user interface 236, it is also possible to control the server 220 remotely, for example, through a network terminal 270 connected through the LAN 224, or through a remote terminal 272 connected through the public Internet 274. Such an arrangement allows remote control of gathering and processing of signal data experienced by the base stations and readers, and remote access to such data and the results of such processing. Numerous applications may be used to provide a user interface to the server 220 and thus to the communication base stations 206A and 206B and the readers 208A and 208B, such as telnet interfaces or MICROSOFT® remote desktop.

Figure 3:
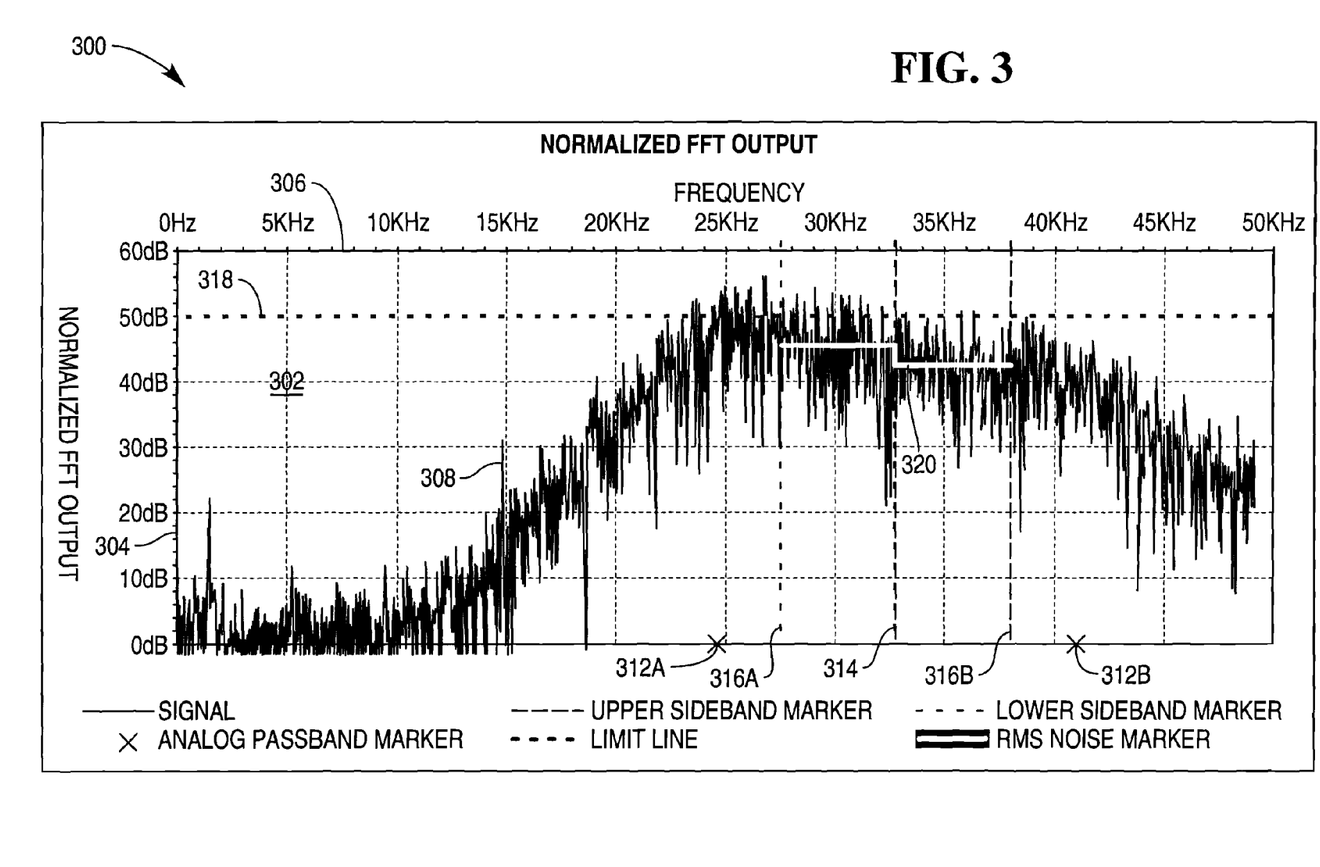
FIGS. 3 and 4 illustrate exemplary signal information that may be detected by a communication device according to an aspect of the present invention.

FIG. 3 illustrates an exemplary display 300 of reflective signal data in the frequency domain. The data presented includes reflective data received in response to transmission of a carrier wave by the reader. The display 300 may suitably be presented for viewing by a server such as the server 114, or a similar device for displaying data supplied by a reader such as the reader 100. The display 300 includes a graph 302 plotting received baseband relative signal strength, as measured along by a y-axis 304, against frequency, as measured along an x-axis 306. The frequency range that is plotted falls within a range of several tens of kilohertz. A curve 308 shows the plot of the data, which is generated by performing a fast Fourier transform on data gathered from signals detected at a reader.

The display 300 includes a number of markers demarcating areas of interest in the graph 302. The markers include analog passband markers 312A and 312B, a lower sideband marker 314, upper sideband markers 316A and 316B, a maximum allowable noise limit marker 318, and a root-mean-squared (RMS) noise marker 320. The markers 312A and 312B, 314, and 316A and 316B illustrate a frequency range of particular interest, and the markers 318 and 320 illustrate output levels indicating a relative signal strength approaching predetermined limits for ambient noise. These markers help a user to more quickly understand the significance of the data presented, by showing areas of interest and limits against which the data is to be compared.

Figure 4:
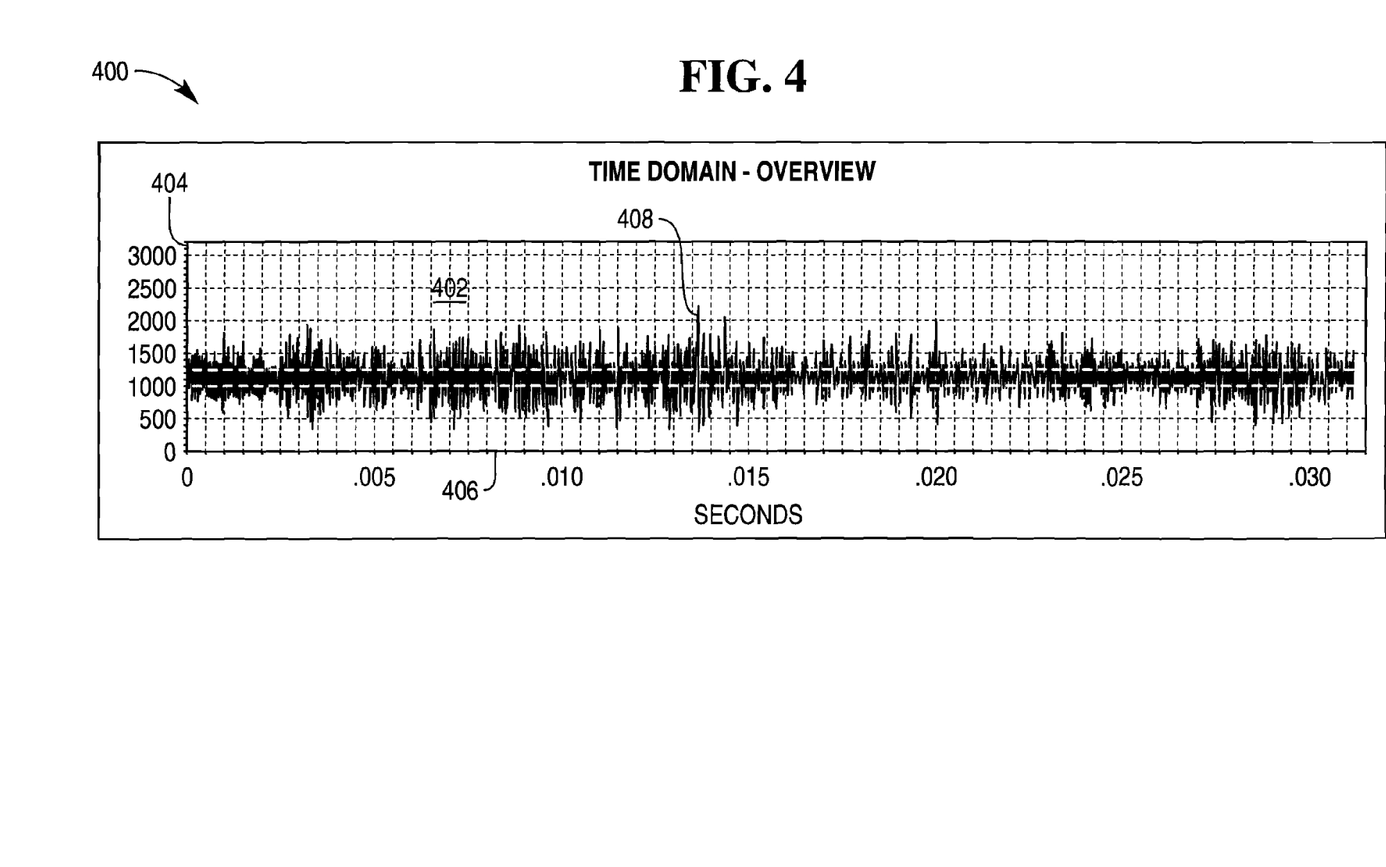

FIG. 4 illustrates a time domain display 400 of reflected signal data, showing a graph 402 plotting relative baseband signal strength, as measured on a y-axis 404, against elapsed time, as measured on an x-axis 406. A curve 408 shows a plot of unprocessed analog to digital converter output data.

Figure 5:
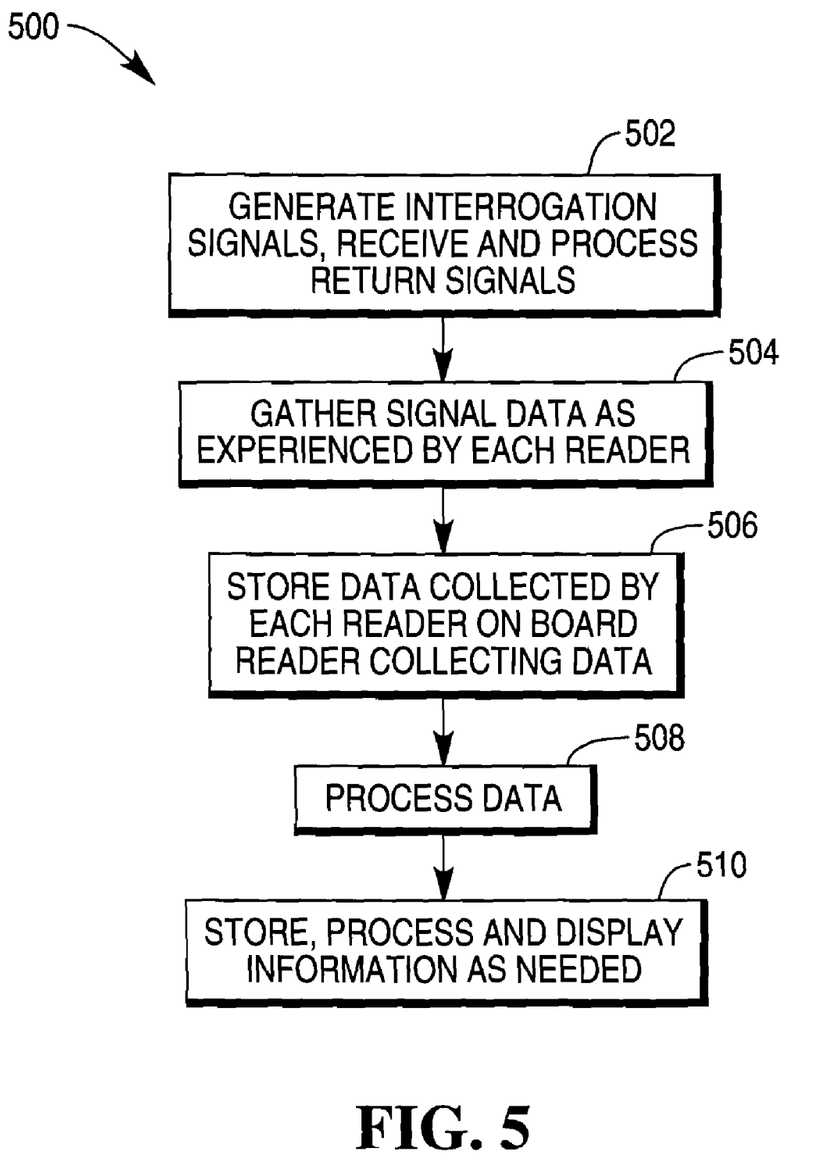
FIG. 5 illustrates a process of signal detection and analysis according to an aspect of the present invention.

FIG. 5 illustrates a process 500 of signal analysis according to an aspect of the present invention. At step 502, one or more of a plurality of RFID communication devices periodically generates an interrogation signal and receives and processes one or more return signals to identify and communicate with a radio frequency identification device.

When it is desired to gather information relating to the environment in which one or more readers is operating, signal data as experienced by the readers is gathered and processed. Steps 504 through 510 below provide for such gathering and processing of data. At step 504, signal data as experienced by one or more readers is gathered. The signal data that is gathered may include high frequency signal data from active sources, baseband signal data, such as signal data from passive sources reflecting carrier signals emitted by a reader, or both. At step 506, the data collected by each reader is stored. At step 508, the data is processed. Processing may be performed at each reader, or alternatively some or all readers may transfer data to a central destination, such as a server, for processing. Processing of data may take the form of subjecting the data to a fast Fourier transform. At step 510, processed data is stored, displayed, or otherwise used as needed.

While the present invention is disclosed in the context of a presently preferred embodiment, it will be recognized that a wide variety of implementations may be employed by persons of ordinary skill in the art consistent with the above discussion and the claims which follow below.

We claim:

1. A radio frequency identification (RFID) reader, comprising:
  a transmitter for transmitting a carrier signal to an RFID device at a relatively high carrier frequency range of 900 MHz or above;
  a receiver for receiving electromagnetic signals present in an environment in which the reader is operating, including a return signal from an RFID device being read by the RFID reader; and
  a processor operative to collect signal data providing information relating to the signals received by the receiver, the processor being operative to identify signal data representing the return signal from the RFID device and process the data to identify the RFID device, the processor being further operative to collect signal data representing the return signal and other signal data providing information relating to additional signals and electromagnetic phenomena present in the environment experienced by the reader, the data being collected including data relating to signals and electromagnetic phenomena interfering with the carrier signal and data relating to signals and electromagnetic phenomena interfering with the return signal, the processor being further operative to perform both baseband and spectrum analysis on the collected signal data in order to show characteristics of signals present in the environment experienced by the reader and tending to interfere with reading of RFID devices by the RFID reader.

2. The reader of claim 1, wherein the receiver is operative to receive a reflected carrier signal imposing information on the carrier signal.

3. The reader of claim 2, further comprising a downconversion unit to downconvert the signals so as to generate a lower frequency signal in a baseband frequency range around 64 kHz representing modulated information imposed on the carrier signal in order to generate the reflected carrier signal.

4. The reader of claim 3, further comprising an analog to digital converter for receiving signal information from the downconversion unit and converting the signal data to a downconverted digital signal for use by the processor.

5. The reader of claim 4, wherein the processor is operative to collect the downconverted digital signal and make the downconverted digital signal available for analysis to identify passive interference experienced by the reader.

6. The reader of claim 4, wherein the processor is operative to direct the transmitter to transmit the carrier signal so that the carrier signal sweeps through frequencies in a frequency range specified so as to produce reflected carrier signals providing desired information relating to passive interference experienced by the reader.

7. The reader of claim 1, wherein the receiver is able to receive active signals transmitted by active sources and wherein the processor is operative to collect the signals transmitted by active sources and make them available for analysis.

8. The reader of claim 7, further comprising a power detector receiving the output of the receiver in order to determine signal power of active signals received by the receiver.

9. The reader of claim 8, further comprising a second analog to digital converter for receiving a power detector output from the power detector and converting the power detector output to digital format for use by the processor.

10. The reader of claim 9, wherein the processor is operative to direct the receiver to conduct a relatively rapid sweep through a predefined frequency range.

11. The reader of claim 10, wherein the processor is operative to analyze the signal information received across the predefined frequency range in order to create a profile of active sources generating the signals.

12. A server for receiving information from a radio frequency identification (RFID) reader, comprising:
an interface for receiving signal data relating to radio frequency signals in a relatively high carrier frequency range of 900 mHz or above and present in an environment in which the reader is operating where the signal data comprises return signal data from an RFID device being read by the reader and other signal data related to additional signals not returned from an RFID device being read by the reader and electromagnetic phenomena not related to the RFID device being read by the reader but present in the environment experienced by the reader and tending to interfere with a carrier signal transmitted by the reader and return signals from RFID devices being read by the reader; and
a processor for performing of baseband and spectrum analysis on the signal data so as to provide information showing a signal environment experienced by the reader including sources of interference and the nature of the interference produced by the sources.

13. The server of claim 12, wherein the signal data received is processed signal data and wherein the processor is operative to manage the processed signal data for storage, display and analysis.

14. The server of claim 12, wherein the signal data received is raw signal data and wherein the processor is operative to perform processing on the raw signal data.

15. The server of claim 14, wherein the processor is operative to perform a fast Fourier transform operation on the raw signal data.

16. A method of signal analysis, comprising the steps of:
receiving signals experienced by a radio frequency identification (RFID) reader having a relatively high carrier frequency range of 900 mHz or above;
processing the signals to detect and identify return signals produced in response to an interrogation by the RFID reader and signals and electromagnetic phenomena tending to interfere with transmission of carrier signals by the RFID reader and reception and processing of the return signals; and
further processing the signals and electronic phenomena to generate signal data related thereto and to analyze the signal data using baseband and spectrum analysis to provide signal information showing the signal environment experienced by the reader including sources of interference and the nature of the interference produced by the sources.

17. The method of claim 16, wherein receiving of the signals includes receiving passive signals representing reflections of a carrier signal by an electronic shelf label communicating in a 2.4 GHz carrier frequency range.

18. The method of claim 17, wherein processing of the signals includes generating signal information for display, storage and analysis.

19. The method of claim 18, wherein processing of the signals includes performing a fast Fourier transform on digitized signal data reflecting a digitization of signals received at a receiver used by the reader.

20. The method of claim 16, wherein receiving of the signals further comprises receiving active signals transmitted by active sources.

21. The method of claim 16, wherein receiving of the signals further includes rapid detection of signals across a predefined frequency range.

22. The method of claim 21, wherein rapid detection of the signals across a predefined frequency range includes rapid successive examination of narrow frequency bands within the frequency range.

* * * * *